(12) United States Patent
Bhogal et al.

(10) Patent No.: US 9,716,973 B2
(45) Date of Patent: Jul. 25, 2017

(54) MOBILE APPLICATION VOLATILITY MANAGEMENT FOR SITUATIONAL APPLICATIONS

(71) Applicant: International Business Machines Corporation, Armonk, NY (US)

(72) Inventors: Kulvir Bhogal, Fort Worth, TX (US); Lisa Seacat DeLuca, Baltimore, MD (US); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/723,566

(22) Filed: May 28, 2015

(65) Prior Publication Data

US 2016/0353234 A1    Dec. 1, 2016

(51) Int. Cl.

| | | |
|---|---|---|
| *H04W 4/02* | (2009.01) | |
| *H04W 76/04* | (2009.01) | |
| *H04W 76/06* | (2009.01) | |
| *H04W 8/22* | (2009.01) | |
| *H04L 29/08* | (2006.01) | |
| *G06F 9/445* | (2006.01) | |

(52) U.S. Cl.
CPC ............... *H04W 4/02* (2013.01); *G06F 8/61* (2013.01); *G06F 8/62* (2013.01); *H04L 67/34* (2013.01)

(58) Field of Classification Search
CPC .......... H04L 63/20; H04L 67/34; H04W 8/22; H04W 4/02; G06F 8/61; G06F 8/62
USPC .......... 726/1, 4; 455/456.1, 203, 411, 414.1, 455/418, 404.2, 414.2, 414.3, 422.1; 717/170, 174, 175, 176, 177, 178; 340/539.2, 7.27; 709/225, 226
See application file for complete search history.

(56) References Cited

U.S. PATENT DOCUMENTS

| | | | |
|---|---|---|---|
| 9,027,076 B2* | 5/2015 | Roach | H04L 63/107 726/1 |
| 2009/0063624 A1 | 3/2009 | Nordstrom et al. | |
| 2010/0319051 A1* | 12/2010 | Bafna | G06F 21/6218 726/1 |
| 2013/0210404 A1 | 8/2013 | Curtis | |
| 2014/0053234 A1 | 2/2014 | Barton et al. | |
| 2014/0205099 A1* | 7/2014 | Christodorescu | H04L 9/0819 380/278 |
| 2014/0250433 A1* | 9/2014 | Stekkelpak | G06F 9/44505 717/176 |

(Continued)

*Primary Examiner* — Inder Mehra
(74) *Attorney, Agent, or Firm* — Steven M. Greenberg, Esq.; CRGO Law

(57) ABSTRACT

A method for managing situational mobile applications of high volatility in a mobile computing device includes first defining a policy specifying under which context a mobile application is to remain installed in a mobile computing device. Thereafter, the policy is loaded into memory of the device and a geolocation is determined for the device. In this regard, the geolocation may include a location of the device, or a present time and date for a location of the device. The policy then is applied to the determined context and, in response to a determination from the application of the policy that the mobile application is to be uninstalled based upon a location of the device being outside of a designated geographic area in which the mobile application had been installed in the device, the mobile application is automatically uninstalled from the device.

15 Claims, 3 Drawing Sheets

(56) References Cited

U.S. PATENT DOCUMENTS

| | | | |
|---|---|---|---|
| 2015/0074536 A1* | 3/2015 | Varadharajan | G06F 3/0481 715/734 |
| 2015/0288676 A1* | 10/2015 | Guo | G06F 21/45 726/7 |
| 2016/0117495 A1* | 4/2016 | Li | G06Q 10/103 726/1 |

* cited by examiner

MOBILE APPLICATION VOLATILITY MANAGEMENT FOR SITUATIONAL APPLICATIONS

BACKGROUND OF THE INVENTION

Field of the Invention

The present invention relates to mobile application management and more particularly to application uninstallation in a mobile computing environment.

Description of the Related Art

Traditional computing involves the selection and installation of one or more computer programs to fixed storage of a computing device and the utilization of those installed computer programs within the computing device. Prior to the advent of mobile computing, computer programs were distributed on portable media such as a diskette or optical storage medium, and copied onto fixed storage of a target computer through a media reader such as a disk drive. The Internet as a software distribution medium changed the manner in which computer programs are installed in so far as no longer are computer programs required to be distributed on portable media. However, the on-demand nature of application installation onto mobile devices by way of application "stores" truly have changed the way in which individuals consumer computer programs in the modern era.

In this regard, mobile computing differs from desktop computing in that applications utilized on the desktop tend to be full featured and therefore large in size. In contrast, in the mobile computing space, due to the limited resources of the mobile computing device, applications tend to be more compact in features, leaner in resource utilization, and therefore, smaller in footprint. As such, computer programs intended for use in the mobile computing environment are more readily installed due to the relatively low impact mobile applications impart upon a host mobile computing device. To with, most mobile applications today are discovered and acquired in publicly accessible online repositories from which desired applications are downloaded on impulse in real time. Thereafter, those applications remain present in the mobile computing device even though in many cases those applications may have been downloaded for a singular purpose—for a particular situation—and thereafter the use thereof is never required again. Such applications are referred to commonly as situational applications.

Despite the compact size of a single situational application, over time, the accumulation of a multiplicity of situational applications can take its tool upon the resources of the mobile computing device in which the applications are installed. Aside from the fixed storage space consumed by each of the situational applications, some situational applications consume other resources through the programmatic utilization of location based services of the mobile computing device, through the programmatic background updating of the situational application thereby resulting in the unwanted consumption of battery life of the mobile computing device, or the periodic posting of notifications to the end user through the mobile computing device. Thus, it is desirable to remove situational applications once the prospective use of the situational applications no longer is likely. However, the manual process in uninstalling different situational applications can be tedious. Further, for situational applications of high volatility in which the prospective utilization exists for a very short period of time, the need to perform manual uninstallation can be frequent compounding matters.

BRIEF SUMMARY OF THE INVENTION

Embodiments of the present invention address deficiencies of the art in respect to the management of mobile applications and provide a novel and non-obvious method, system and computer program product for managing situational mobile applications of high volatility in a mobile computing device. In an embodiment of the invention, a method for managing situational mobile applications of high volatility in a mobile computing device is provided. The method includes first defining a policy specifying under which context a mobile application is to remain installed in a mobile computing device. Thereafter, the policy is loaded into memory of the mobile computing device and a geolocation is determined for the mobile computing device. The policy then is applied to the determined geolocation and, in response to a determination from the application of the policy that the mobile application is to be uninstalled based upon a location of the mobile computing device being outside of a designated geographic area in which the mobile application had been installed in the mobile computing device, the mobile application is automatically uninstalled from the mobile computing device. Likewise, a different policy can be defined which specifies under which context a different mobile application is to become installed in a mobile computing device so that when the different policy is applied to the context, a determination can be made that the different mobile application is to be installed, and in consequence, the different mobile application is installed onto the mobile computing device.

In another embodiment, a mobile application management data processing system is provided. The system includes a mobile computing device that has memory, at least one processor, a display and a network adapter, and fixed storage, all contained within a single housing. The system also includes an operating system executing in the memory of the device and a multiplicity of mobile applications installed in the mobile computing device and stored in the fixed storage. Finally, the system includes a situational mobile application management module executing in the memory of the device. The module includes program code enabled to store a policy specifying under which context one or more of the mobile applications are to remain installed in the mobile computing device, to load the policy into the memory of the mobile computing device, to determine a geolocation for the mobile computing device, to apply the loaded policy to the determined geolocation, and to respond to a determination from an applying of the policy that one or more of the mobile applications are to be uninstalled based upon a location of the mobile computing device being outside of a designated geographic area in which the mobile application had been installed in the mobile computing device, by automatically uninstalling the one or more of the mobile applications from the mobile computing device.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for managing situational mobile applications of high volatility in a mobile computing device. In accordance with an embodiment of the invention, one or more policies governing the different lifecycles of one or more different applications in a mobile computing device are defined. Each policy can specify one or more applications to be retrieved from over a computer communications network and installed in the mobile computing device responsive to determining a particular location of the mobile computing device, one or more applications to be uninstalled from the mobile computing device responsive to determining a particular location of the mobile computing device, or when one or more applications are to be uninstalled from the mobile computing device relative to a lapse of time from a time of installation of one or more of the applications. Thereafter, the policies can be loaded into memory of the mobile computing device and applied with respect to one or more applications so as to effectuate either or both of the installation of one or more applications into or from the mobile computing device.

Figure 1:
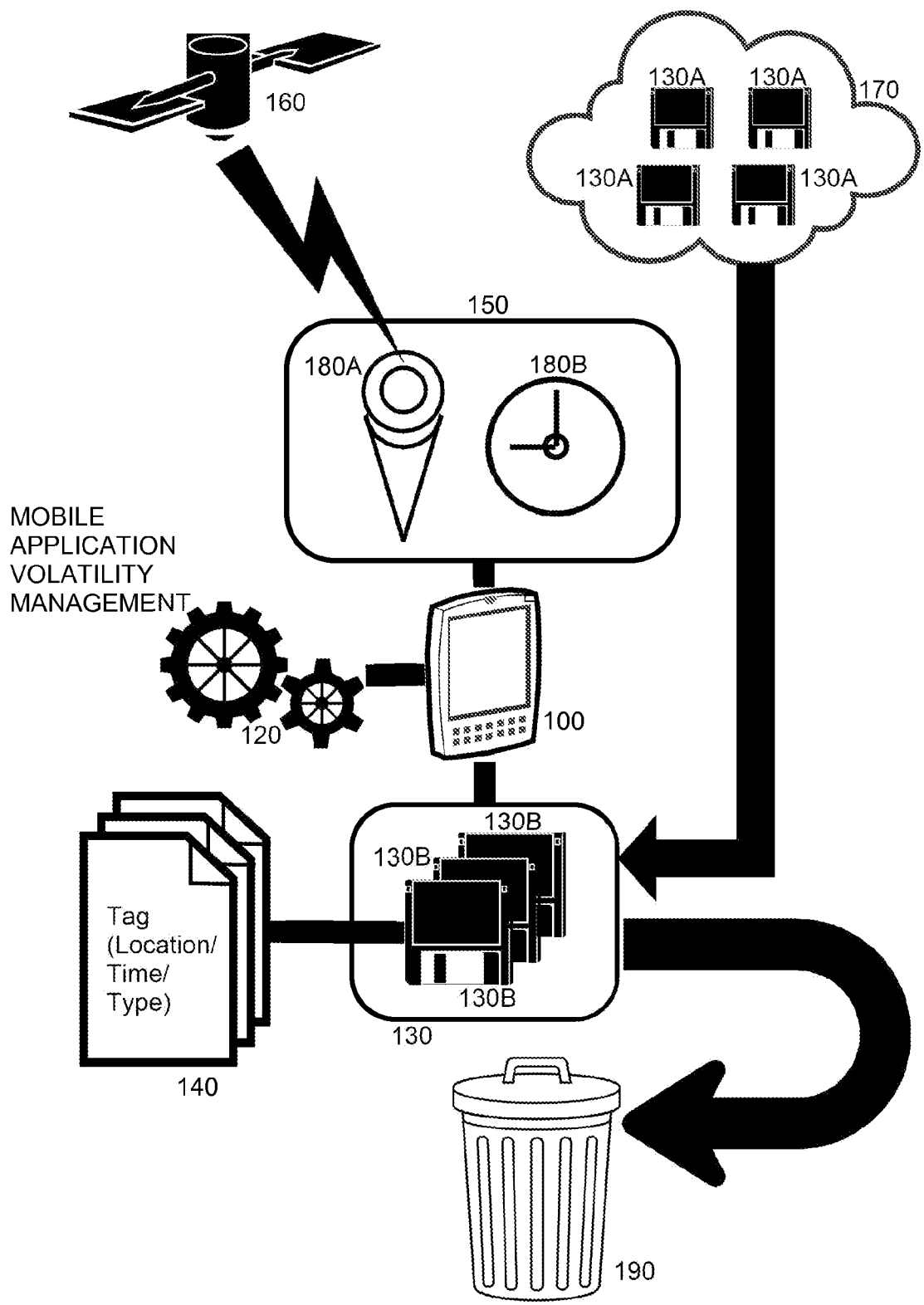
FIG. 1 is a pictorial illustration of a process for managing situational mobile applications of high volatility in a mobile computing device.

In further illustration, FIG. 1 pictorially shows a process for managing situational mobile applications of high volatility in a mobile computing device. As shown in FIG. 1, one or more different mobile applications 130B are stored in a local repository 130 of a mobile computing device 100. Mobile application volatility management logic 120 determines a contemporaneous context 150 for the mobile computing device 100. In this regard, the context 150 is a geographic location 180A of the mobile computing device 100, for instance as determined by global positioning system (GPS) satellite data 160, or a present time and/or date 180B for the mobile computing device 100. Based upon the determined context 150, one or more policies (not shown) are applied to the determined context 150 in order to determine whether or not to direct an uninstallation operation 190 to uninstall one or more of the installed mobile applications 130B from the local repository 130, or whether or not to automatically install one or more mobile applications 130A in a remote repository 170 into local repository 130.

More specifically, a policy can specify a geographic region in which an installed one of the mobile applications 130B is to remain installed. Alternatively, a policy can specify a geographic region in which an uninstalled one of the mobile applications 130A is to be installed in the mobile computing device 100. As yet another alternative, a policy can specify a duration of time in which one or more of the mobile applications 130B may remain installed. In this regard, one or more of the mobile applications 130B can be associated with a corresponding tag 140 specifying either a temporal or geographic volatility of the corresponding one of the mobile applications 130B such that different policies can be applied to different groupings of the installed mobile applications 130B based upon a volatility indicated by corresponding ones of the tags 140. Also, the tag 140 can indicate a type of the corresponding one of the mobile applications 130B so that one or more other mobile applications 130A in the remote repository 170 can be identified as being related and suggested for installation onto the mobile computing device 100 by the mobile application volatility management logic 120

Figure 2:
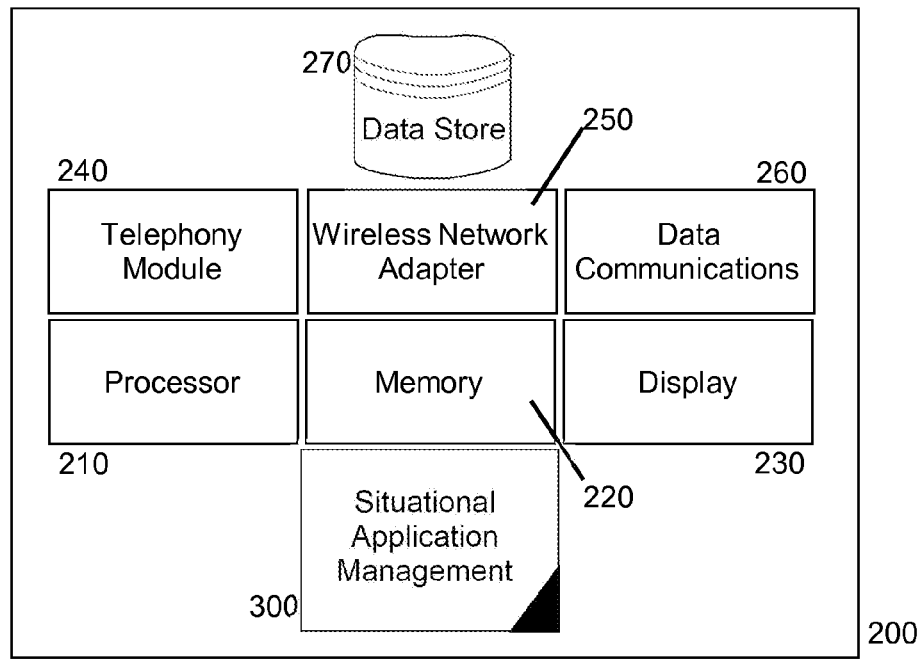
FIG. 2 is a schematic illustration of a mobile computing data processing system configured for managing situational mobile applications of high volatility in a mobile computing device.

The process described in connection with FIG. 1 can be implemented within a mobile computing data processing system. In yet further illustration, FIG. 2 schematically shows a mobile computing data processing system configured for managing situational mobile applications of high volatility in a mobile computing device. As shown in FIG. 2, a mobile computing device 200 is provided as part of the mobile computing data processing system. The mobile computing device 200 includes one or more processors 210, memory 220 and a display 230. The mobile computing device 200 also includes a telephony module 240 enabled to establish and maintain cellular telephone connections in the mobile computing device 100. The mobile computing device 200 further includes a wireless network adapter 250 configured to establish and maintain a wireless data communications connection in the mobile computing device 100. In connection with the telephony module 240 and the wireless network adapter 250, data communications circuitry 260 manages the transmission of data onto a data communications network accessed either through the telephony module 240 or the wireless network adapter 250.

Of note, a situation application management module 300 executes in the memory 220 of the mobile communications device 200. The module 300 includes program code enabled upon execution through an operating system of the mobile computing device 200 to retrieve one or more policies from a data store 270. The policies each specify either a context of the mobile computing device 100 in which one or more installed mobile applications are to be uninstalled from the mobile computing device 100, or a context of the mobile computing device 100 in which one or more yet to be installed mobile applications are to be installed into the mobile computing device 100. In this regard, the context can be a geographic location of the mobile computing device in which a mobile computing application is to be installed and operable and outside of which the mobile computing application is no longer necessary and is to be uninstalled, or a current time and date such that a duration of time beyond which one or more installed applications in the mobile computing device 100 are to be removed from the mobile computing device 100.

Figure 3:
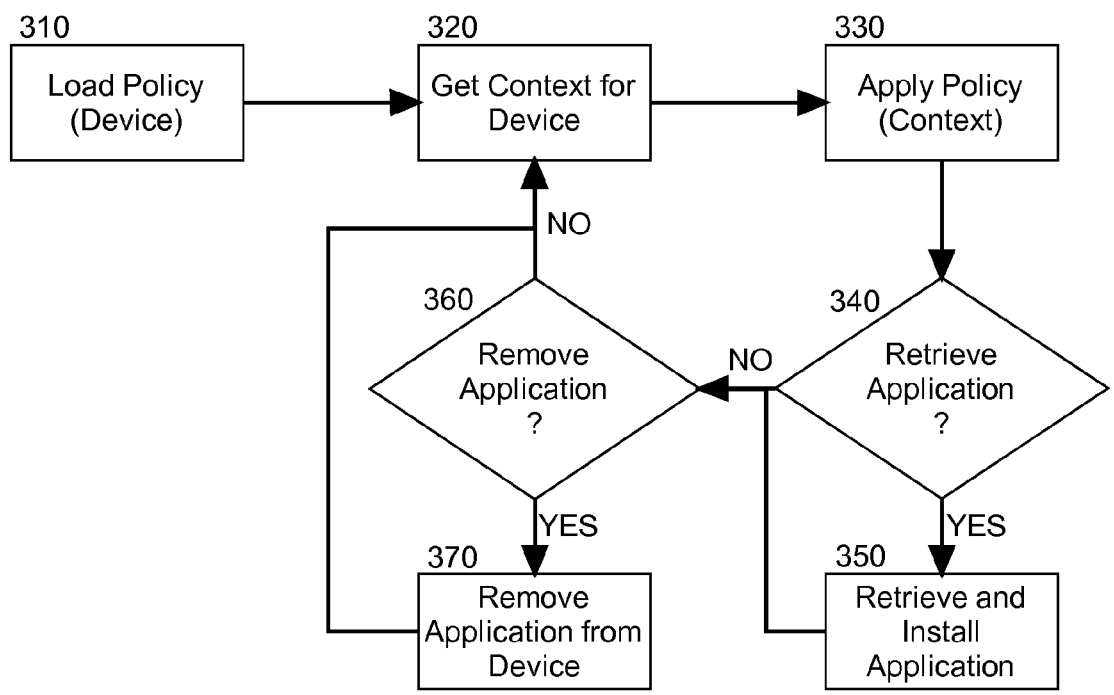
FIG. 3 is a flow chart illustrating a process for managing situational mobile applications of high volatility in a mobile computing device; and, FIG. 4 is a flow chart illustrating a process for managing installation of a set of related situational applications of high volatility in a mobile computing device.

In even yet further illustration of the operation of the situational application management module 300, FIG. 3 is a flow chart illustrating a process for managing situational mobile applications of high volatility in a mobile computing device. Beginning in block 310, a policy is loaded into memory of the mobile computing device. In block 320, a context is determined for the mobile computing device, for instance a geographic location or current time. In block 330, the loaded policy is applied to the context in order to determine either or both of, in decision block 340, whether or not to install a mobile application not yet installed in the mobile computing device, or in decision block 360, whether or not to uninstall a mobile application already installed in the mobile computing device. In the former instance, in block 350 a specified mobile application is retrieved from over a data communications network and installed into the mobile computing device. In the latter instance, in block 370 a specified mobile application is uninstalled from the mobile computing device.

Figure 4:
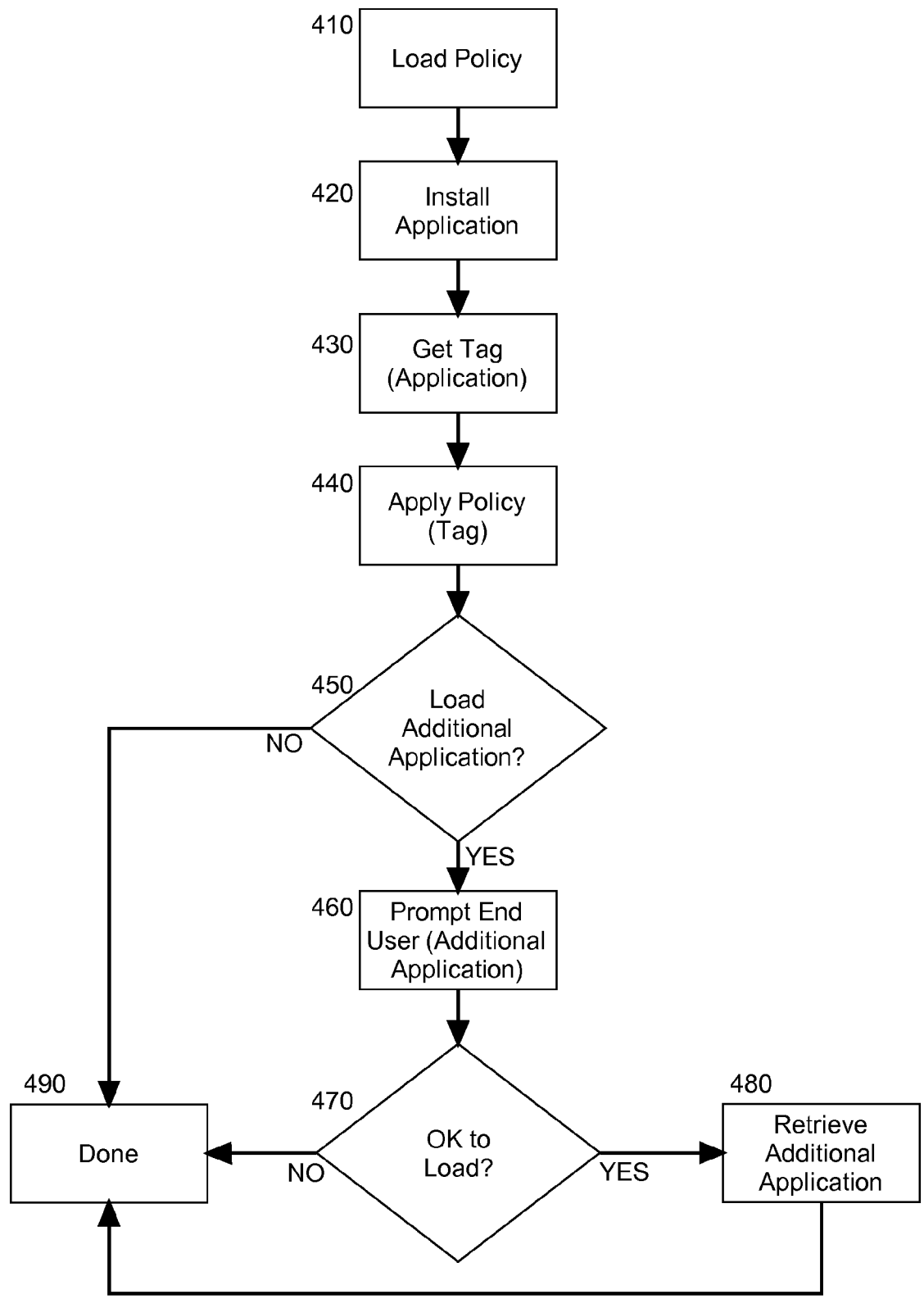

Of note, the installation of a particular mobile application onto the mobile computing device can influence the installation of one or more related mobile applications so that a suite of pertinent mobile applications becomes available to the end user when contextually appropriate according to the policy of the mobile computing device. In even yet further illustration, FIG. 4 is a flow chart showing a process for managing installation of a set of related situational applications of high volatility in a mobile computing device. Beginning in block 410, a policy is loaded into memory of the mobile computing device. The policy specifies which if any mobile applications or tags for any mobile applications may be suggested for installation onto the mobile computing device in response to an attempt to install a particular mobile application. In block 420, the particular application is installed onto the mobile computing device.

Thereafter, in block 430 a tag for the particular application is inspected and the policy applied thereto in block 440 so as to either retrieve a listing of one or more related mobile applications based upon one or more tags in the policy, or to directly specify the listing of the one or more related mobile applications based upon the tag for the particular application. In decision block 450, it is determined based upon the application of the policy whether or not to suggest to the end user the installation of the one or more related mobile applications. If the determination is such that no other mobile applications are related by the policy, the process ends in block 490. Otherwise, in block 460 a prompt is generated and displayed in the mobile computing device suggesting the installation of one or more mobile applications related by the policy. In decision block 470, if the end user indicated by way of the prompt that the suggested mobile application or mobile applications are to be installed along with the particular mobile application, in block 480 the suggested mobile application or mobile applications are retrieved from a remote repository and installed onto the mobile computing device.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for managing situational mobile applications of high volatility in a mobile computing device, the method comprising:
    defining a policy specifying under which context a mobile application is to remain installed in a mobile computing device;
    loading the policy into memory of the mobile computing device;
    determining a context for the mobile computing device;
    applying the loaded policy to the determined context; and,
    responsive to a determination from the applying of the policy that the mobile application is to be uninstalled, identifying a tag associated with the mobile application that indicates a volatility matching the determined context and also specifies a type for the mobile application, automatically directing an uninstallation operation in the mobile computing device to uninstall the mobile application from the mobile computing device because the volatility of the associated tag matches the determined context, attempting to identify other mobile applications installed in the mobile computing device with associated tags that also specify a same type as that of the identified tag associated with the mobile application, and on condition that at least one other mobile application installed in the mobile computing device is identified as being associated with a tag specifying the same type as that of the identified tag, also prompting in the mobile computing device for an uninstallation of the identified other mobile applications.

2. The method of claim 1, wherein the context is a duration of time having lapsed since an installation of the mobile application in the mobile computing device.

3. The method of claim 1, wherein the context is a location of the mobile computing device outside of a designated geographic area in which the mobile application had been installed in the mobile computing device.

4. The method of claim 1, wherein the applying of the policy to the context results in an uninstallation of the mobile application only in so far as the corresponding tag labels the mobile application as a situational application.

5. The method of claim 1, further comprising:
    defining a different policy specifying under which context a different mobile application is to become installed in a mobile computing device;
    loading the different policy into memory of the mobile computing device;
    applying the loaded different policy to the determined context; and,
    responsive to a determination from the applying of the different policy that the different mobile application is to be installed, automatically installing the different mobile application onto the mobile computing device.

6. A mobile application management data processing system comprising:
    a mobile computing device comprising memory, at least one processor, a display and a network adapter, and fixed storage, all contained within a single housing;
    an operating system executing in the memory of the device;

a multiplicity of mobile applications installed in the mobile computing device and stored in the fixed storage; and, a situational mobile application management module executing in the memory of the device, the module comprising program code enabled to store a policy specifying under which context one or more of the mobile applications are to remain installed in the mobile computing device, to load the policy into the memory of the mobile computing device, to determine a context for the mobile computing device, to apply the loaded policy to the determined context, and to respond to a determination from an applying of the policy that one or more of the mobile applications are to be uninstalled, by identifying a tag associated with the mobile application that indicates a volatility matching the determined context and also specifies a type for the mobile application, automatically directing an uninstallation operation in the mobile computing device to uninstall the one or more of the mobile applications from the mobile computing device because the volatility of the associated tag matches the determined context, attempting to identify other mobile applications installed in the mobile computing device with associated tags that also specify a same type as that of the identified tag associated with the mobile application, and on condition that at least one other mobile application installed in the mobile computing device is identified as being associated with a tag specifying the same type as that of the identified tag, also prompting in the mobile computing device for an uninstallation of the identified other mobile applications.

7. The system of claim 6, wherein the context is a duration of time having lapsed since an installation of the mobile application in the mobile computing device.

8. The system of claim 6, wherein the context is a location of the mobile computing device outside of a designated geographic area in which the mobile application had been installed in the mobile computing device.

9. The system of claim 6, wherein the applying of the policy to the context results in an uninstallation of the mobile application only in so far as the corresponding tag labels the mobile application as a situational application.

10. The system of claim 6, wherein the program code is further enabled to:
store a different policy specifying under which context a different mobile application is to become installed in a mobile computing device;
load the different policy into memory of the mobile computing device;
apply the loaded different policy to the determined context; and,
respond to a determination from the applying of the different policy that the different mobile application is to be installed, by automatically installing the different mobile application onto the mobile computing device.

11. A computer program product for managing situational mobile applications of high volatility in a mobile computing device, the computer program product comprising a computer readable storage medium having program instructions embodied therewith, the program instructions executable by a device to cause the device to perform a method comprising:
defining a policy specifying under which context a mobile application is to remain installed in a mobile computing device;
loading the policy into memory of the mobile computing device;
determining a context for the mobile computing device;
applying the loaded policy to the determined context; and,
responsive to a determination from the applying of the policy that the mobile application is to be uninstalled, identifying a tag associated with the mobile application that indicates a volatility matching the determined context and also specifies a type for the mobile application, automatically directing an uninstallation operation in the mobile computing device to uninstall the mobile application from the mobile computing device because the volatility of the associated tag matches the determined context, attempting to identify other mobile applications installed in the mobile computing device with associated tags that also specify a same type as that of the identified tag associated with the mobile application, and on condition that at least one other mobile application installed in the mobile computing device is identified as being associated with a tag specifying the same type as that of the identified tag, also prompting in the mobile computing device for an uninstallation of the identified other mobile applications.

12. The computer program product of claim 11, wherein the context is a duration of time having lapsed since an installation of the mobile application in the mobile computing device.

13. The computer program product of claim 11, wherein the context is a location of the mobile computing device outside of a designated geographic area in which the mobile application had been installed in the mobile computing device.

14. The computer program product of claim 11, wherein the applying of the policy to the context results in an uninstallation of the mobile application only in so far as the corresponding tag labels the mobile application as a situational application.

15. The computer program product of claim 11, wherein the method further comprises:
defining a different policy specifying under which context a different mobile application is to become installed in a mobile computing device;
loading the different policy into memory of the mobile computing device;
applying the loaded different policy to the determined context; and,
responsive to a determination from the applying of the different policy that the different mobile application is to be installed, automatically installing the different mobile application onto the mobile computing device.

* * * * *